United States Patent [19]

Strömberg

[11] Patent Number: 5,237,450
[45] Date of Patent: Aug. 17, 1993

[54] INERTIAL STABILIZING SYSTEM

[76] Inventor: Rolf Strömberg, Stavangergatan 8, Spånga, S-163 33, Sweden

[21] Appl. No.: 836,001
[22] PCT Filed: Aug. 21, 1990
[86] PCT No.: PCT/SE90/00539
 § 371 Date: Feb. 21, 1992
 § 102(e) Date: Feb. 21, 1992
[87] PCT Pub. No.: WO91/02997
 PCT Pub. Date: Mar. 7, 1991

[30] Foreign Application Priority Data

Aug. 23, 1989 [SE] Sweden .................. 8902806

[51] Int. Cl.⁵ .................. G02B 27/64; G03B 5/00
[52] U.S. Cl. .................................................. 359/554
[58] Field of Search .................. 359/554-557, 359/429

[56] References Cited

U.S. PATENT DOCUMENTS 2,688,456 9/1954 Jensen .
3,564,931 2/1971 Humphrey .
3,591,250 7/1971 Feinstein .
3,756,686 9/1973 Humphrey .
4,643,539 2/1987 Brignall .
4,662,727 5/1987 Griffin .................. 359/555
4,856,882 8/1989 Oshima et al. .................. 359/554

FOREIGN PATENT DOCUMENTS 321342 6/1989 European Pat. Off. .
WO86/01307 2/1986 World Int. Prop. O. .

OTHER PUBLICATIONS

R. Whalley et al., "The Oscillogyro", *J. of Mechan. Eng. Sci.*, 1967, vol. 9, No. 1, pp. 55-61.

*Primary Examiner*—Jon W. Henry
*Attorney, Agent, or Firm*—Collard & Roe

[57] ABSTRACT

The present invention comprises an inertial stabilizing system to be used preferably in connection with image stabilizing of hand-held optical instruments. An ultralight oscillogyro (1-6) serves as a reference element by which the angular position in inertial space is detected. An electromechanical control system causes a gimbaled part (19) of the optics to assume essentially the same angular position in space assumed by the rotation plane of the rotor of the oscillogyro. The oscillogyro is modified for a widened angular range and the damping of the gyro is utilized for obtaining directly the possibility of target tracking.

12 Claims, 9 Drawing Sheets

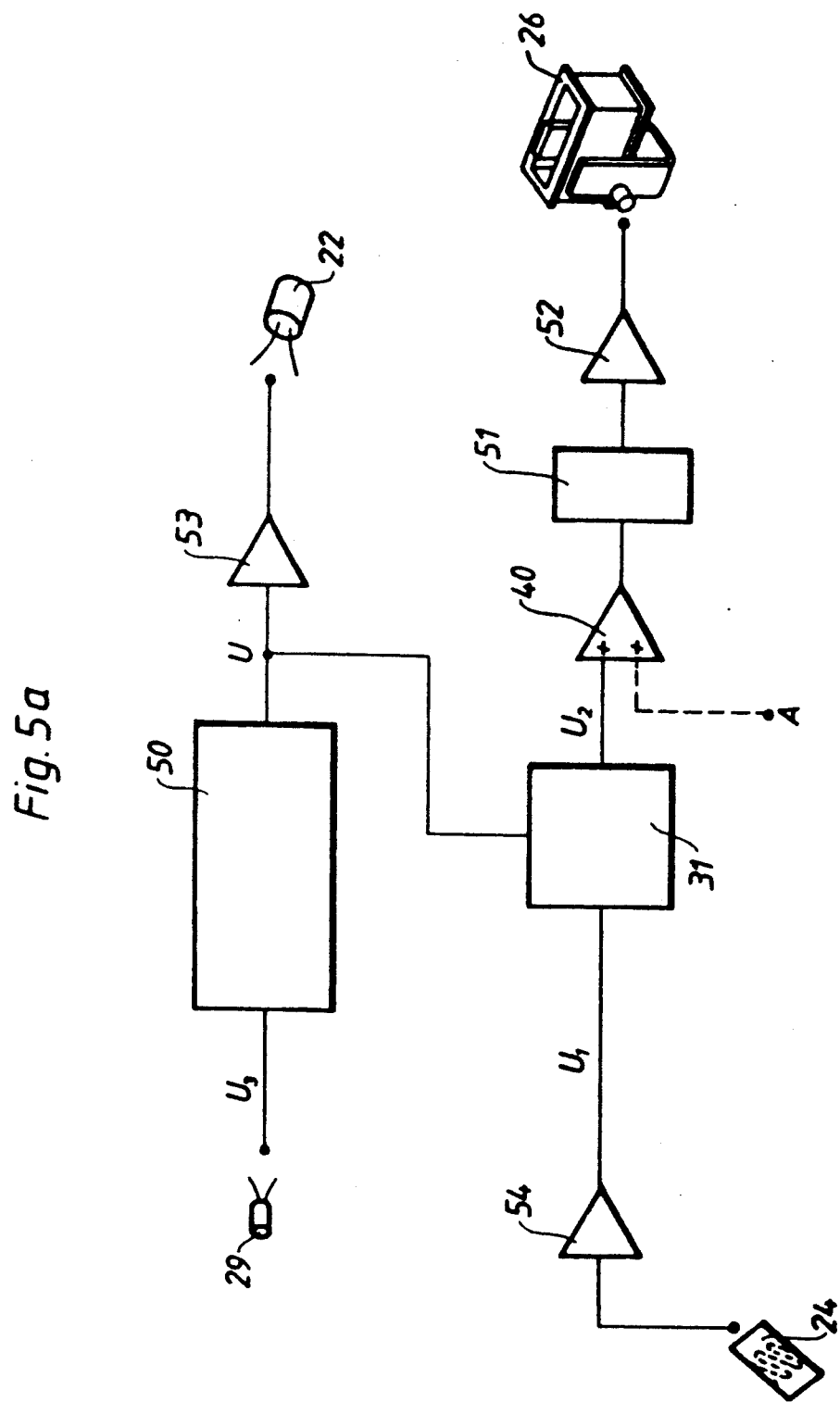

Fig. 5b
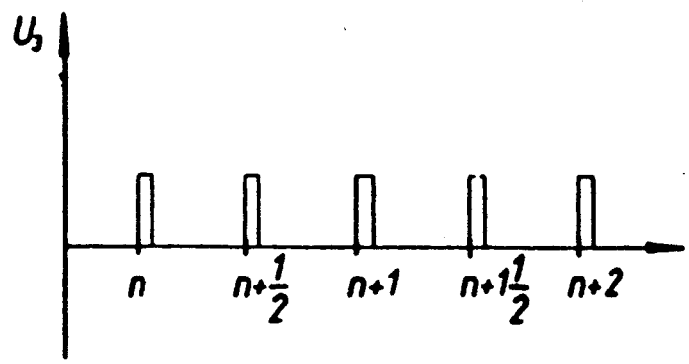
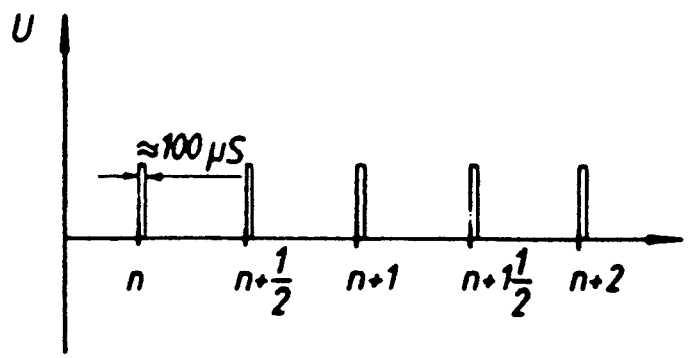
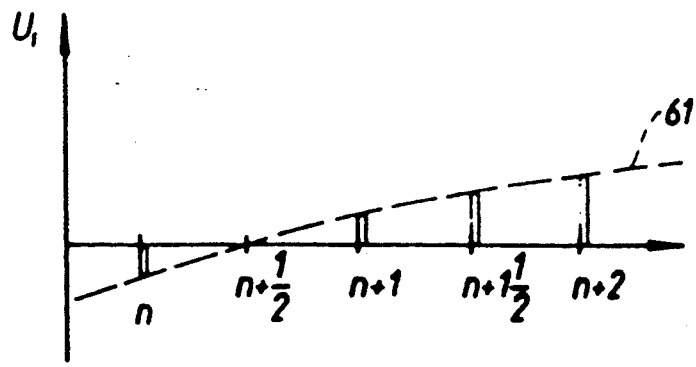
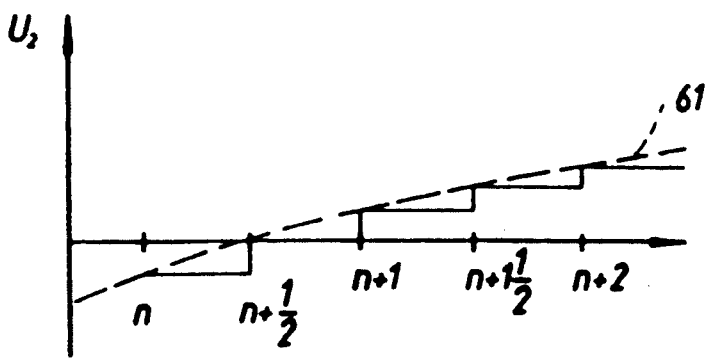

INERTIAL STABILIZING SYSTEM

TECHNICAL FIELD

The present invention relates to an inertial stabilizing system to be used preferably in connection with image stabilization for hand-held optical instruments. An ultralight oscillogyro functions as a reference element by which the angular position in inertial space is detected, and an electromechanical control system causes a gimbaled part of the optics to assume substantially the same angular position in space as that assumed by the rotational plane of the rotor of the oscillogyro. The oscillogyro is modified for a widened angular range, and the damping of the gyro is utilized for obtaining directly the possibility of target tracking.

PRIOR ART

Within the field of hand-held image stabilized binoculars and cameras a plurality of mutually different optical concepts have been presented. The great majority of these concepts have one feature in common, viz., that only one part of the optics within the instrument is maintained inertially stabilized, whereas the rest of the instrument is not stabilized. Relative angular movement of said inertially stabilized part of the optics and the instrument casing is made possible by a gimbaled bearing. This common principle of image stabilization is used in most instruments on the market intended for hand-held observation, and nowadays it can be considered as completely conventional.

Even if several solutions relating to the design of the gimbaled part have been proposed, the methods of inertially stabilizing said gimbaled part have exhibited remarkably few solutions working well. As a matter of fact, there is hardly any solution today which has not got at least some serious disadvantages.

One of these solutions of the stabilizing problem is the one proposed in U.S. Pat. No. 2,688,456. Unfortunately, this solution has great disadvantages among which sensitivity to bearing friction and play can be mentioned. Balancing of the gimbaled part must be carried out extremely accurately, still, good properties are never attained.

Therefore solutions have been presented where a gyro is mounted on the gimbaled part in order to enhance stability. Disadvantages here are a comparatively high power consumption for driving the rotor of the gyro, a long time before the gyro rotor reaches operative speed (15-60 seconds for some commercially available instruments) and a considerably increased weight, as in practice the gyro and the batteries have to be comparatively heavy. In order to make panning (target tracking) possible a precessing mechanism is necessary, which could cause a considerable loss of power when panning takes place.

In addition, there are problems associated with nutation oscillations when the gyro is rigidly secured to the gimbaled part. In order to solve these nutation problems a resilient and viscous coupling between the gyro and the gimbaled part can be used, which increases complexity, weight and volume. Examples of this technology is given in U.S. Pat. No. 3,564,931, where also the nutation problem is more closely elucidated.

A third possible principle to apply in order to obtain best stability is to refrain from connecting the gyro mechanically to the stabilized part, but to detect instead the position of the gyro by means of electronics so that signals are generated which are then used to urge, via small electromechanical actuators, the gimbaled part towards stability. The expected advantage of this solution is i.a. that it ought to be possible to design the gyro much smaller, resulting in reduced total weight and volume, but up to now it would seem that advancements have been modest in practice; in few if any of the hand-held image-stabilizing instruments on the market at present this principle is applied. The problem of reducing starting time, weight, power consumption and complexity does not seem to have been satisfactorily solved, for which reason the potential advantages appear not to have justified selection of this concept.

SUMMARY OF THE INVENTION

The present invention is a representative of this third category. An ultralight rotor in an oscillogyro is dimensioned, in a preferred embodiment, to behave with respect to its angular position in space as the gimbaled optical part in an image stabilized telescope should do, and this gimbaled optical part is then caused, by means of a simple electromechanical control system, to maintain the same angular position in space as that assumed by the rotor.

Unique practical advantages of a stabilizing system design according to the invention are i.a.: the starting time is so short, about 1/10 second, that the gimbaled optical part can be mechanically released at the same time as the oscillogyro is started, which eliminates the delays, often unacceptable, of 15-60 s mentioned above. The power generation is so low that a very small drive motor and small batteries can be used which reduces weight and volume of the complete image stabilizing instrument. No precessing mechanism is necessary and, also, no nutation problems exist. No heavy, complicated or bulky components are included and fabrication can take place without time consuming adjustments. In a preferred embodiment of the invention detection of the position of the rotor can be carried out optoelectronically by means of simple zero detectors, which eliminates the demand for good detector linearity.

DESCRIPTION OF THE FIGURES

The invention will be described below, primarily in connection with a preferred embodiment.

Thus

FIG. 5a shows a block diagram of the electronic system,

FIG. 5b shows an associated voltage diagram,

DESCRIPTION OF AN EMBODIMENT

Figure 1:
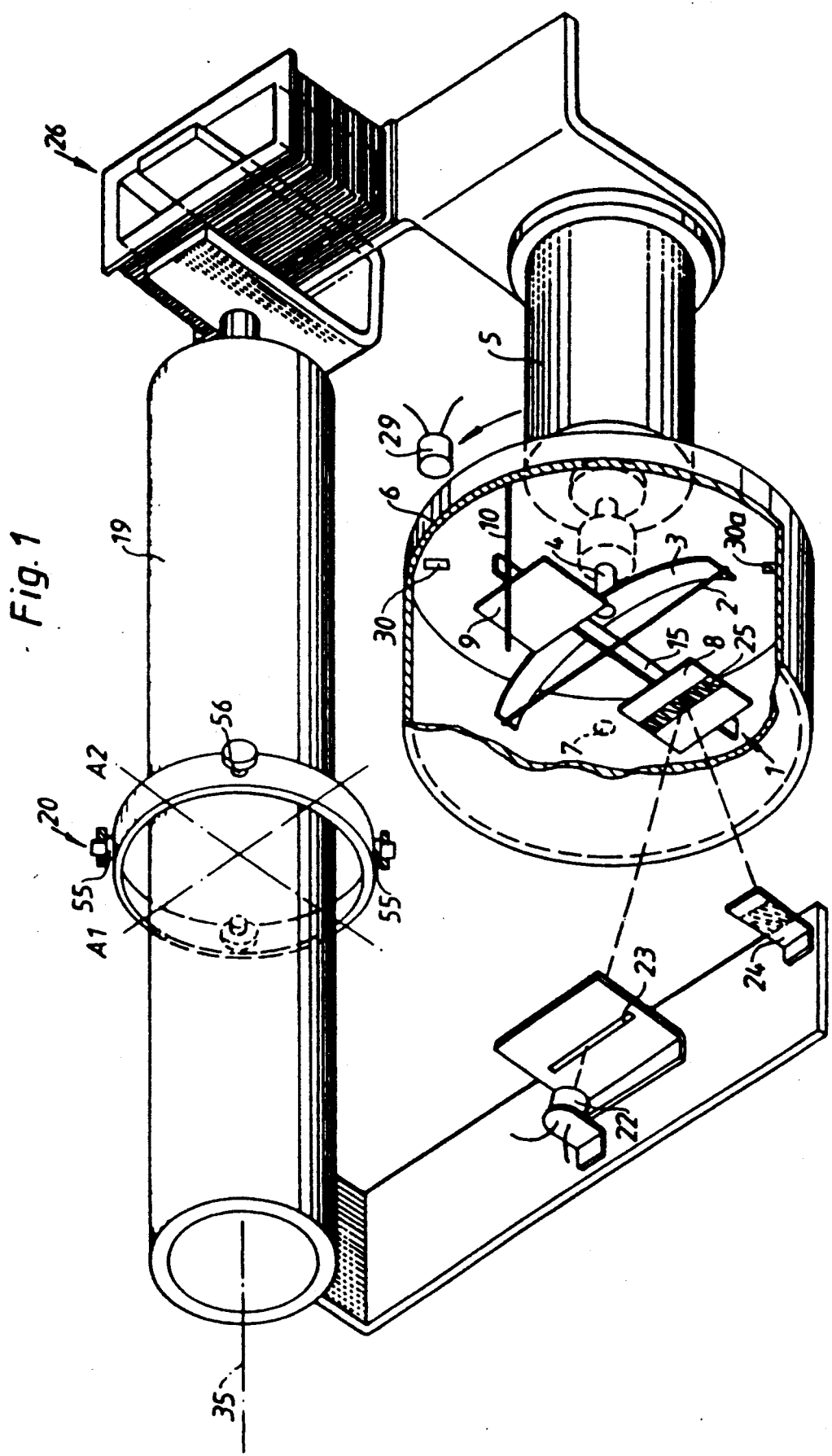
FIG. 1 shows the comprehensive mechanics of a control system according to the invention.

The general function is first described very briefly with reference to FIG. 1. A motor 5, motor shaft 4, leaf spring 3, torsion wire 2 an a rotor 1 constitute (with a minor exception, later to be described) an oscillogyro, which is generally conventional. For a description of the oscillogyro principles reference is made to The Journal of Mechanical Engineering Science 1967, Vol. 9, No. 1, pp 55–61, by R Whalley, M J Holgate and L Maunder, "The Oscillogyro".

The gimbaled optical part 19 is illustrated in FIG. 1 in the form of a cylinder but it is to be understood that this optical part 19 corresponds to the stabilized part in an image-stabilized instrument. The appearance of this part and what optics it carries is of no consequence to the present invention. Every completely stabilized optical part in an image stabilized instrument defines an optical line-of-sight, which is found in FIG. 1 as a line 35.

The motor 5 is secured to the casing (not shown) of the instrument and thus it follows the movements of the casing. Within the case 6 of the oscillogyro there is a rotor 1 rotating in a plane which, on a short time basis, is inertially stabilized and thus isolated from higher frequencies of turning movements of the instrument casing about all axes orthogonal to motor shaft 4. The gimbaled optical part 19 is movable by way of gimbal 20 a small angle, about ±5 degrees, in relationship to the instrument casing about gimbal axes 55 and 56 and thus about all axes orthogonal to the optical line-of-sight 35 of the instrument. However, gimbal 20 does not allow part 19 to rotate about line-of-sight 35 in relation to the instrument casing. When the instrument is not used it is advisable that the gimbaled optical part 19 be mechanically locked to the instrument casing in a position where the optical line-of-sight 35 is parallel with motor shaft 4. This position is shown in FIG. 1. In use optical part 19 is disengaged but locked by way of an electromechanical control system to the angular position in the inertial space assumed by the rotational plane of rotor 1. Consequently the optical part, as the rotor, is inertially stabilized on short time basis. In addition, the stabilized optical part 19 should be statically balanced on its bearings.

When the instrument casing is turned slowly, which takes place in panning or target tracking the rotational plane of the rotor will participate in this turning, with a certain lag, thanks to the specific properties of the present oscillogyro. As the gimbaled optical part 19 is locked by way of the control system to the angular position of the rotational plane of the rotor, also optical part 19 will participate in the turning movement of the casing, rendering target tracking possible.

Rotor 1 has the form of a bar 15 having a length of the order of 40 mm. On this rotor bar two thin plates 8 and 9 are secured. Rotor 1 is secured to the thin torsion wire 2 which in turn is secured to and maintained tensioned by the bent leaf spring 3. On its central point spring 3 is secured to motor shaft 4. The case 6, containing all rotating parts, is secured to motor shaft 4. In practice rotor 1 need not have a greater moment of inertia than $1.10^{-7}$ kgm$^2$, measured about the axis represented by torsion wire 2.

A practical detail is the fact that the force by which leaf spring 3 tensions wire 2 has to be so great that the angular resonance frequency relating to rotor 1 translation in a plane orthogonal to wire 2 is greater than the angular frequency by which motor shaft 4 rotates.

As rotor 1 is secured to torsion wire 2 it is obvious that rotor 1 can only tilt to and fro about the axis which wire 2 represents, as viewed in relationship to case 6. When the oscillogyro is in operation motor shaft 4 and thus case 6, leaf spring 3, torsion wire 2 and rotor 1 rotate at constant speed, and rotor 1 will then rotate or spin in a plane practically maintaining its angular orientation in the inertial space, even if motor 5 is slewed a small angle about an axis orthogonal to motor shaft 4.

In principle the plane described by rotor 1 behaves, on a short time basis, as a free gyro rotor. There are very small deviations from the position completely inertially stabilized but such deviations can be disregarded in practice, which will be done in the following. Even if the function of a turned oscillogyro (as described above) is well known it is mentioned here that the centering torsion moment of wire 2 during rotation is neutralized by small dynamic decentering reaction moments generated in rotor 1, about the axis represented by wire 2. These decentering reaction moments increase with the speed (RPM) squared, whereas the centering torsion movement generated by wire 2 is of course not depending on speed. From this follows that at a certain speed (the tuned one) the decentering reaction moment is equal to the centering torsion moment excercised by wire 2, the two moments neutralizing one another, and rotor 1 can then rotate uneffected by any undesired net moment. Therefore it is important in practice that the speed of motor 5 be maintained constant and equal to the tuned speed.

Case 6 encloses all gyro components, which is desirable as otherwise the surrounding air would have a negative effect on the stability of the ultralight rotor 1 by the turbulence which would have arisen. It is obvious that the air surrounding rotor 1 within case 6 participates in the rotation and is not turbulent in any disturbing way thanks to case 6. However, case 6 should not be completely tight; a small hole 7 sees to it that there can be no pressure difference within and without case 6 to deform the case. This hole should be located as shown in FIG. 1, thus in or near the longitudinal axis of drive shaft 4, an arrangement which does not cause any air turbulence within case 6.

It is also desirable that case 6 does not add too much rotational inertia to the rotating parts, which would increase unnecessarily the starting time of motor 5. A low rotational inertia of case 6 will be attained if thin plastics are used.

Figure 4:
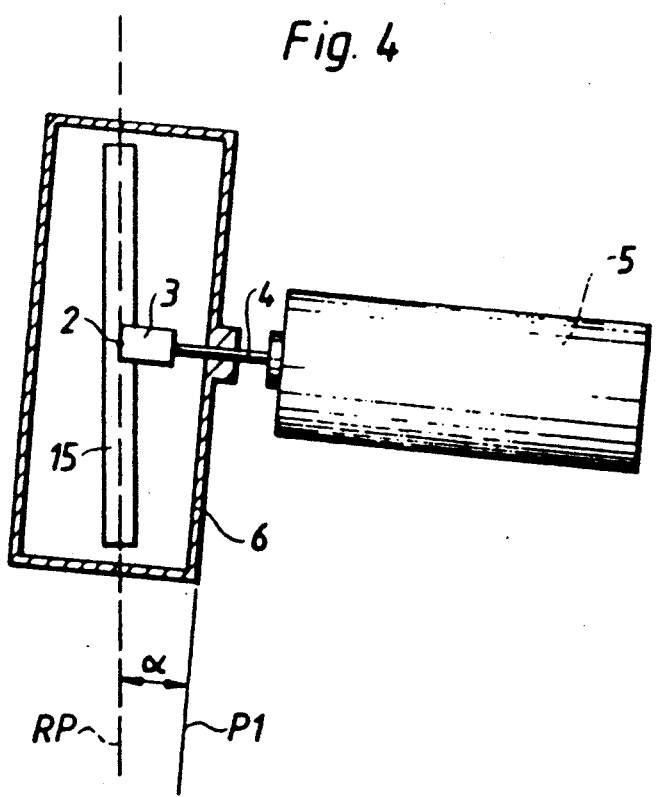
FIG. 4 shows, in elevation, the gyro rotated an angle α.

Reference is now made to FIG. 4. As the plane within which rotor 1 is rotating (in the following designated "rotational plane of the rotor" and indicated in FIG. 4 by dashed line RP) will behave, on a short time basis, as a free gyro rotor it will maintain its angular position in space immediately after motor 5 has slewed a small angle α about an axis orthogonal to motor shaft 4. In FIG. 4 rotor bar 15 is shown in that very moment of time when it is in the plane of the paper. The angle α between the rotational plane of the rotor and an imaginary plane P1 orthogonal to motor shaft 4 will be referred to in the following as "the angular deviation of the rotational plane".

Thus it can be established that the rotational plane RP of the rotor is essentially inertially stabilized on a short time basis.

Figure 10:
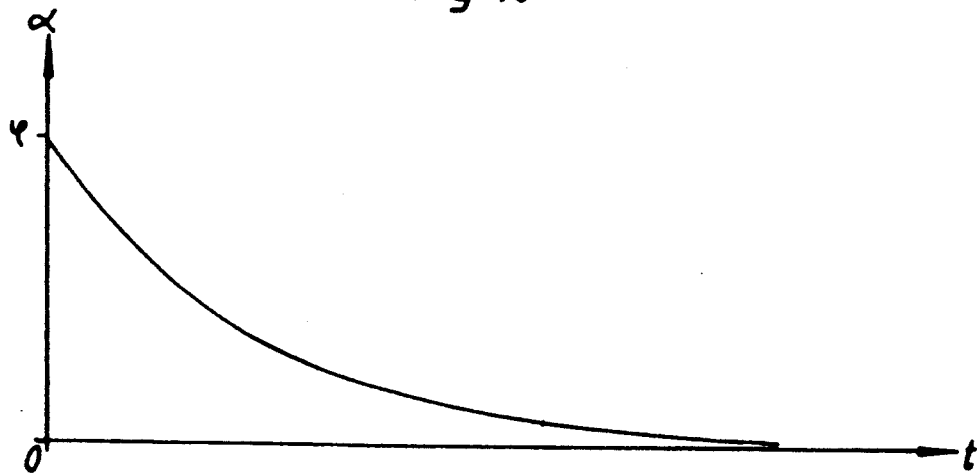
FIG. 10 shows a curve of the step response of the rotor and, finally.

On the other hand, on a long time basis the rotational plane of the rotor should not, according to the invention, be inertially stabilized but travel slowly from a decentered position back to the central position perpendicular to motor shaft 4. This is accomplished by motor 5 being secured to the instrument casing at the same time as rotor 1 is dimensioned to exhibit a very low moment of inertia measured about the axis defined by wire 2. If at the same time plates 8 and 9 are suitably sized, with an area of the order of 1 square centimeter each, the viscous coupling between motor 1 and case 6 provided by the air within case 6 will have sufficient influence to bring about the desired centering of the rotational plane of the rotor. In other words, if the instrument casing and thus motor 5 is suddenly turned a small angle φ in relation to inertial space about an axis orthogonal to the rotational shaft 4 of the motor (t=0 in FIG. 10) and then maintains its novel position, the rotational plane RP of the rotor will precess slowly back to the central position perpendicular to motor shaft 4 at an angular velocity which in any moment of time is proportional to the angular deviation α of the rotational plane. In other words, the angular deviation α will then exponentially approach zero, which is illustrated by FIG. 10.

The precessing back to the central position described above can be utilized as a possibility of target tracking. This is a great advantage as the centering takes place spontaneously; specific processing devices are eliminated. This constitutes a preferred embodiment of the present invention. If the design parameters are selected such that the time constant of the centering process of the rotational plane of the rotor becomes about 1 second, the rotational plane of the rotor will behave, with respect to its angular position in space, in a manner which is also very suitable to the gimbaled optical part of image-stabilized binoculars. If the casing of the binoculars is turned at a certain limited angular speed the rotational plane of the rotor will participate, at a certain lag, in this turning movement, that is, target tracking occurs.

A purpose of the present invention, and also necessary in most cases, is to enable in practice a larger angular deviation α, at least 5 degrees, of the rotational plane of the rotor than is possible to obtain by conventional oscillogyro mechanics. In image-stabilized binoculars there may occur in practice rapid oscillations of the casing in relation to inertial space of at least ±5 degrees, and as motor 5 is unstabilized and thus follows the oscillations of the casing, but the rotational plane of the rotor is inertially stabilized and thus isolated from rapid oscillations, also the rotational plane RP of the rotor has to be able to assume an angular deviation α of at least the same degree in relation to the unstabilized parts (e.g. motor 5). This demand, thus that the rotational plane RP of the rotor should be able to carry out, with stability maintained, an angular deviation α of at least about 5 degrees, requires that special measures be taken. If not, the following phenomena will have a detrimental effect on the stability: as rotor 1 and rotor shaft 4 do not rotate in the same plane when there is an angular deviation α present but are interconnected by way of wire 2, there is introduced on rotor 1 a small disturbing moment which tends to destroy stability when the angular deviation of the rotational plane exceeds a few degrees only. It can be said that this disturbing moment is caused by the fact that rotor 1 is forced, because of said angular difference, to rotate in its rotational plane at a somewhat uneven angular velocity, one revolution considered. Said disturbing moment will increase in proportion to the angular deviation α cubed, for which reason it cannot, as distinguished from the centering moment of the wire 2, be compensated by tuning the motor RPM. As it is often necessary in practice that the angular deviation of the rotational plane of the rotor amounts to at least 5 degrees, this problem has to be eliminated.

Figure 11:
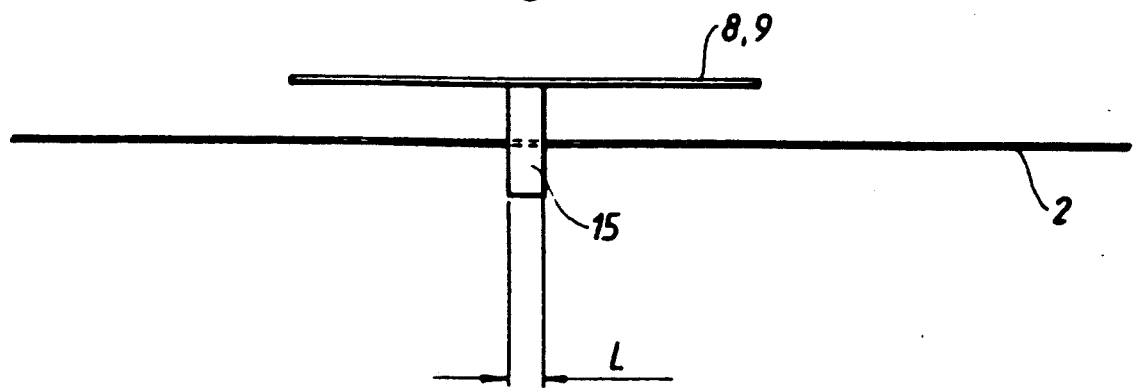
FIG. 11 shows an end view of the rotor 1.

According to the invention this is carried out in such a way that an angular resilience is introduced between wire 2 and rotor 1. This angular resilience enables rotor 1 to perform small angular movements (in practice <<1 degree) in relationship to wire 2 (and thus also in relation to motor shaft 4) in the rotational plane of the rotor, thus also permitting rotor 1 to rotate at a uniform angular speed in its rotational plane. The simplest way in practice to introduce this angular resilience is to make the distance L (shown in FIG. 11, where distance L should not be seen as a measure of the width of rotor bar 15) between the securing points of the wire (2) on either side of rotor bar 15 sufficiently small, as wire 2 is maintained tensioned at a constant but limited force by leaf spring 3. It is obvious that the smaller distance L, the less stiff rotor mounting in relation to wire 2, considering small angular movements of rotor 1 in its rotational plane. Also, as a matter of course, some other equivalent type of flexible coupling can be introduced between wire 2 and rotor 1; the important fact is that the small mutual angular movements of wire 2 and rotor 1 in the rotational plane of the rotor are allowed to occur in operation.

This angular resilience creates a new problem which could be best understood if the case 6 and thus the rotor 1 with its several components are first considered at rest, thus not rotating. Now, as rotor 1 is not rigidly but resiliently secured with respect to small angular movements in a plane orthogonal to motor shaft 4 there is arising in this plane a tendency towards angular resonance Ω of rotor 1.

The angular frequency of the resonance concerned can be written:

$$\Omega = \sqrt{\frac{K(t)}{I}}$$

where K(t) is a measure of the angular resiliency described above and I is the rotor moment of inertia measured about motor shaft 4. If behavior in rotation is now considered it turns out that a mechanical phenomenon of interference arises if Ω coincides with the angular frequency Ω(m) of motor shaft 4 rotation. This problem disappears if Ω(m) never reaches Ω. For attaining favourable results in practice {Ω−Ω(m)}=63 rad/s could be selected.

There is a further problem arising, for which reason reference is now made once more to FIG. 1. In order to avoid that rotor 1, on account of the angular resilience, tilts too much transversely to wire 2 when starting the gyro, the angular acceleration of motor shaft 4 then being very high, a stop is required, in the form of a rigid bar 10 secured to case 6. When motor shaft 4 and thus all rotating components have reached their full speed in the direction of the curved arrow, the angular acceleration ceases and rotor 1 will then leave bar 10, as bar 10 is located such that normally it does not make contact with rotor 1.

Figure 2A:
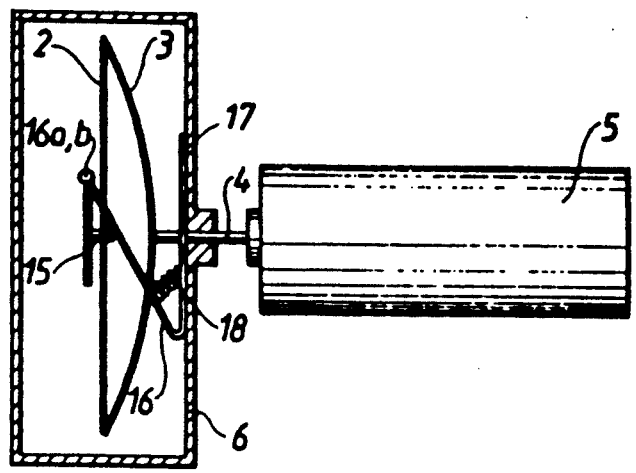
FIGS. 2a and 2b show a rotor start centering mechanism.
Figure 2B:
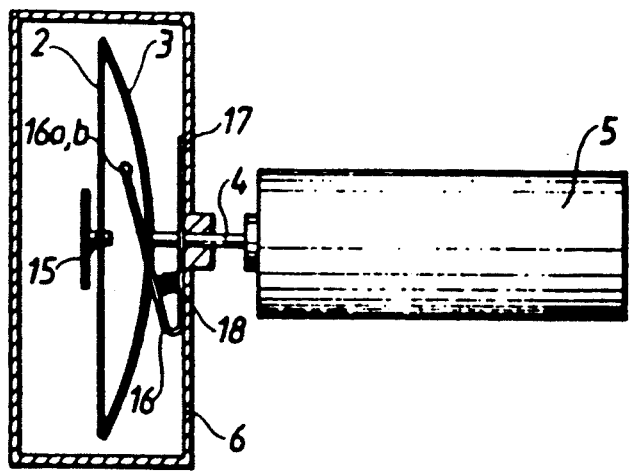

A practical detail is that rotor 1 should be locked in a central position, i.e. at an angle of 90 degrees to motor shaft 4, before motor 5 is started, to be freed for tilting about wire 2 only when a certain rotational speed has been reached. If this condition is not satisfied there could be, in practice, a considerable angular deviation of the rotational plane of the rotor immediately after start, which is mostly undesirable. Reference is now made to FIGS. 2a and 2b illustrating a possible mechanism for locking the rotor before start. A locking clip 16 is pivotally carried in the base 17 and can tilt a small angle in relation to said base, which is rigidly connected with motor shaft 4. A coiled spring 18 urges locking clip 16 towards rotor bar 15 (as shown in FIG. 2a) when motor 5 is not running. Locking clip 16 is designed such that it will then contact rotor bar 15 on either side of wire 2, rotor 1 thus being locked in a centered position and prevented from tilting about wire 2. When motor 5 has reached a certain speed, but not full speed, after start, locking clip 16 is affected, by way of the weights 16a and 16b, by centrifugal force to tilt away from the position shown in FIG. 2a and remain in that shown in FIG. 2b, where rotor 1 is free to rock about wire 2.

Figure 3:
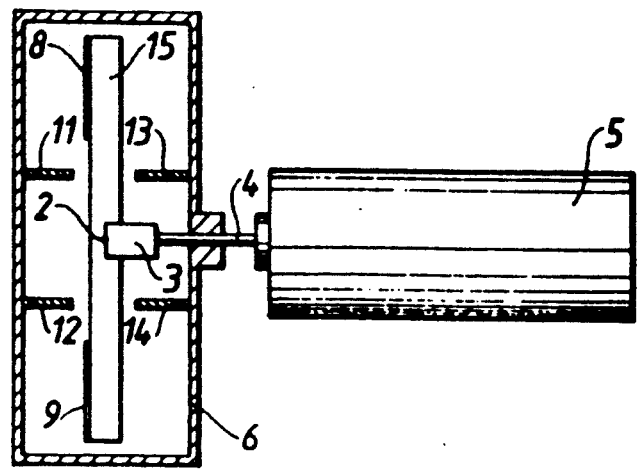
FIG. 3 illustrates shock protection of the oscillogyro.

Reference is now made to FIG. 3 where bumpers in the form in soft stops 11, 12, 13 and 14 are shown. They are secured to case 6 and limit gently the rocking movement of rotor bar 15 about wire 2 when the binoculars are panned so swiftly that the viscous air coupling between rotor 1 and case 6 does not suffice for precessing rotor 1. Stops 11–14 also receives rotor 1 at shock acceleration in a direction parallel to motor shaft 4, possibly occurring if the instrument e.g. is dropped. If the shock acceleration occurs in a direction parallel to rotor bar 15 there must also be stops, as wire 2 is rather resilient also in this direction. These stops can be formed, for example, by the inside of case 6 which the ends of rotor bar 15 may contact. For shock acceleration in a direction parallel to wire 2 no stops are needed as leaf spring 3 and wire 2 can be dimensioned sufficiently strong to assume the force. By these tricks it is gained that the complete rotor mechanism becomes very shockproof.

It is emphazised that all mechanical features described above are needed in order to attain a good result, but they are not all illustrated in one and the same figure, for reasons of clarity.

Still another practical detail is the fact that motor shaft 4 should be forced, immediately upon start, to reach its proper speed as soon as possible which, if motor 5 is DC-operated, can be readily brought about by maintaining the motor 5 drive voltage on a higher than normal level immediately after start, to be then decreased to a constant, lower value when motor 5 has reached its proper speed.

If the above instructions are followed and if the structural parameters are correctly selected, the rotational plane of the rotor will now be stable on a short time basis. It will precess aperiodically from a decentered position back to the centre position with a suitable time constant, of the order of 1 second, exactly as the stabilized part of a pair of image stabilized binoculars should do in order that a good result be attained.

Again reference is made to FIG. 1. The only step that remains to be taken is to lock by way of a control system the angular position of the gimbaled optical part 19 to the angular position of the rotational plane of the rotor in order to accomplish the desired stability of the gimbaled part 19. Two control systems have to be at hand which control the gimbaled part about two mutually perpendicular axes A1 and A2, orthogonal to the optical line-of-sight 35 of the instrument. However, only one of these control systems, viz., that operating about one of the axes A1, is described in detail here, as control about the second axis (A2) is exercised in the same manner.

An infrared light diode (LED) 22 emits short pulses of light, of the order of 100 microseconds/pulse, towards rotor 1 by way of a slot 23, which is parallel with the axis (A1) about which detection occurs. Case 6 has to be transparent to the infrared light where this passes the wall of the case. The light pulses are reflected by the plates 8 and 9 secured to rotor 1 (reflection by plate 8 is illustrated in FIG. 1), the plates being foiled and thus also acting as mirrors. Upon reflection the light finally strikes an optical zero-detector 24, whose back side is visible in FIG. 1. The light striking zero detector 24 is limited by slot 23 to a narrow band of a width adapted to the zero detector concerned. As a matter of course the light will also strike mirror 8 as a band 25. Light diode 22, slot 23 and zero detector 24 are all secured to the gimbaled optical part 19. A zero voltage output from zero detector 24 can only occur when the light band 25 is centered on the middle of zero detector 24 which, in turn, can only occur when part 19 and the rotational plane RP of the rotor have a certain mutual angular orientation about axis A1. This is the situation when the gimbaled optical part is "locked" by way of the control system to the rotational plane of the rotor. Any mutual angular deviation from this situation gives cause to an output voltage from zero detector 24, said voltage being treated electronically to form a signal finally applied to an electromechanical actuator 26 which induces mechanically the gimbaled optical part 19 to reassume its normal "locked" position about axis A1. Actuator 26 is thus adapted to turn optical part 19 about axis A1.

Actuator 26 can be designed optionally but it should not introduce friction. A possible design is shown in FIG. 1, where a wire coil 27 is secured to the instrument casing and the U-shaped permanent magnet 28 is secured to the gimbaled optical part 19. An input voltage on coil 27 then gives rise to a force tending to rotate the gimbaled part 19 about the axis concerned (A1).

A light pulse from light diod 22 is to be emitted only at the time when case 6 and thus rotor 1 are in a position for indicating the relative angular position, about the axis concerned (A1), of optical part 19 and plane of rotation RP of the rotor. This occurs only twice per revolution, namely, when wire 2 is parallel with that axis (A1) about which the control system operates. Hence, in practice one light pulse is to be emitted when wire 2 is parallel with that axis about which the actuator 26 is able to turn optical part 19.

It suffices to emit a light pulse only once per revolution although two light pulses per revolution are recommended, but the light pulse is to be emitted only when rotor 1 is in position, in accordance with the rule above. In order to render this possible in practice the angular position of case 6 has to be detected in some way, which can be brought about by means of a reflex detector 29 mounted on the instrument casing. See now also the block diagram in FIG. 5a and the voltage diagram in FIG. 5b. Reflex detector 29 scans two diametrically opposed reflecting indications 30 and 30a near the periphery of case 6, thereby giving rise to a pulsing digital voltage U3.

U3 is conveyed to a pulse generator 50 which emits, for each positive flank of U3, a voltage pulse of a length of the order of 100 uS, a pulsating voltage U then being obtained which controls, via an exciter 53, light diode 22 so as to emit light only when voltage U is high.

It is understood that the two indications 30 and 30a shown give rise to two voltage pulses U3 and thus two light pulses per revolution. To attain one light pulse only per revolution, one of the indications should be excluded.

The situation we now have means that short light pulses strike zero detector 24 regularly, the detector therefore creating via an input stage 54 short voltage pulses U1, provided that the light does not strike exactly at the centre of zero detector 24. To convert these voltage pulses U1 to a voltage more continuous they are conveyed to a "sample and hold" circuit 31 which is held open only when voltage U is high. After "sample and hold" circuit 31 there will thus be a more continuous voltage U2, which is amplified and frequency filtered in a filter 51 in accordance with conventional regulation theory, before it is applied to actuator 26 by way of an output stage 52. In FIG. 5b curve 61 is arbitrarily chosen for illustrative purpose in order to show how U2 depends on U1.

The adding circuit 40 will be discussed later.

Figure 6:
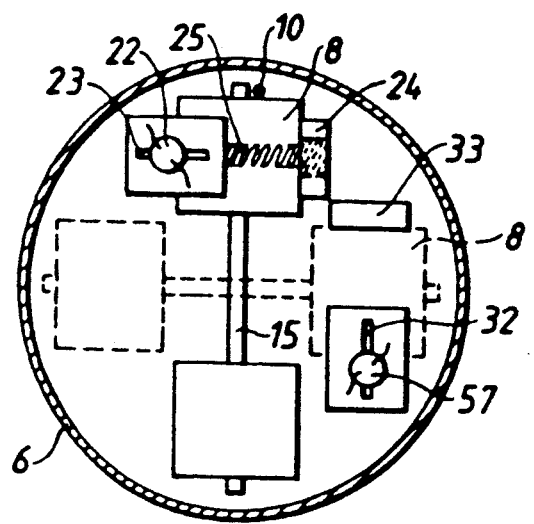
FIG. 6 shows an end view of the oscillogyro.

The control device described above only operates about one single axis (A1), which is orthogonal to the line-of-sight 35 of the instrument, but as stated above it is necessary, in order to bring about a complete image-stabilizing process, to add a second similar control device to attain stabilizing about all axes orthogonal to the line-of-sight 35 of the instrument. Suitably this second control device operates in the same way as that described above but about an axis (A2) orthogonal to the first axis (A1), also this axis (A2) being orthogonal to the line-of-sight 35 of the instrument. In FIG. 6 the position of the rotor is illustrated by dashed lines in the moment of time when light diode 57 is to emit a light pulse. The light from light diode 57 passes slot 32, is reflected by the mirror 8 of the rotor and strikes finally zero detector 33.

A second actuator capable of turning the stabilized optical part 19 about axis A2 will also be added.

Furthermore: it is noted that the relative position of the gimbaled part 19 (in its centered position) and the oscillogyro need not be such as shown in FIG. 1, however, it must be seen to it that the light bands from light diodes 22 and 57 never miss mirrors 8 and/or 9 in operation.

Although the invention has been described above in its preferred embodiment a few alternative embodiments will be described below.

In the first place it could be desirable in certain instruments to stabilize the optical part about one axis only, orthogonal to the line-of-sight. In this case this optical part should be movable in relationship to the instrument casing about this axis only, and only one control system is then required.

It should be made clear that a stabilizing system according to the invention should be possible to use without prejudice together with other types of instruments or apparatus where a body is inertially stabilized on a short time basis and, on a long time basis, connected to the instrument casing. Thus the gimbaled part 19 need not necessarily contain optics, a prerequisite up to now.

If desired the air within case 6 can be replaced by an optional gas which, having another viscosity than the air, could create, other conditions alike, a changed viscous coupling between rotor 1 and case 6 and thus a changed time constant for precessing of the rotational plane of the rotor back to the central position perpendicular to motor shaft 4.

Another coupling between rotor 1 and motor shaft 4, provided optionally and operating equivalently, can replace in whole or in part the viscous effect of the air enclosed within case 6. This is exemplified in FIG. 9 where, for the sake of clarity, leaf spring 3 is not shown. A pin 44 mounted on rotor bar 48 extends through a very thin and resilient diaphragm 47 into a container 45 mounted on motor shaft 49 and containing a viscous liquid 46. In this case the two mirrors (8 and 9 on rotor 1) could suitably be replaced by one single mirror 43 mounted on the centre of rotor bar 48. Mirror 43 only couples insignificantly to the air enclosed in case 34, for which reason the viscous coupling provided by pin 44 in container 45 is required in order to render possible centering of the rotational plane of the rotor and thus target tracking. This also illustrates the fact that the rotor can be designed optionally within rather wide limits if only the mechanical parameters are selected such that the rotor behaves as desired.

Figure 9:
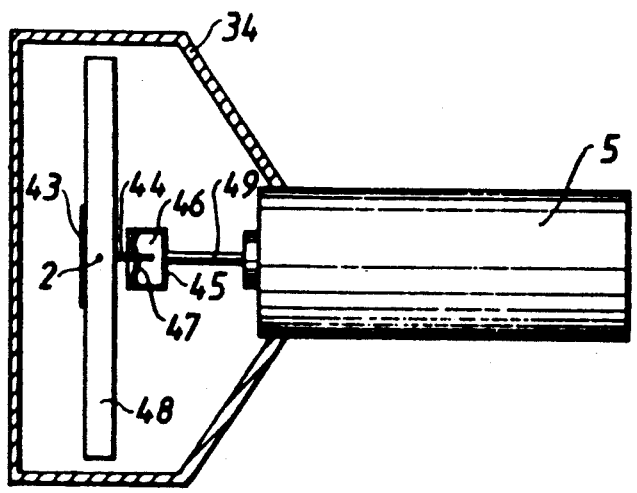
FIG. 9 shows i.a. an alternative gyro rotor and an alternative rotor case.

Case 6, which according to the foregoing description has been mounted on motor shaft 4 and thus did participate in the rotation, can be replaced if desired by a stationary housing 34, also shown in FIG. 9, mounted on the motor. However, this is not recommended as disturbances caused by air turbulence can arise.

The case can also be eliminated completely, but this is even less recommended, for the same reasons.

Furthermore: torsion wire 2 can be replaced by some other type of single axis bearing, for example, a conventional such bearing having crossed leaf springs.

It is not necessary that the gimbaled optical part is maintained completely locked to the rotational plane RP of the rotor, with respect to mutual angular position. If desired small mutual angular differences can be obtained in a simple manner if a voltage (U4) is connected to adding circuit 40 in FIG. 5a, U4 being added to voltage U2. If the zero detector 24 is replaced by an optical position detector of greater liniarity, substantial mutual angular differences between the rotational plane of the rotor and the gimbaled optical part 19 can be obtained by way of voltage U4. It is not essential to the invention what this voltage U4 looks like or how it is obtained. As a special case of some practical importance, that could be mentioned where the gimbaled optical part 19 is designed in such a way that it has to describe, for image stability, an angular movement proportional to the angular movement of the instrument casing. A detection, finally producing U4, is then to take place of the mutual angle, between the gimbaled optical part and the instrument casing about the axis (A1, A2) under consideration.

Figure 7:
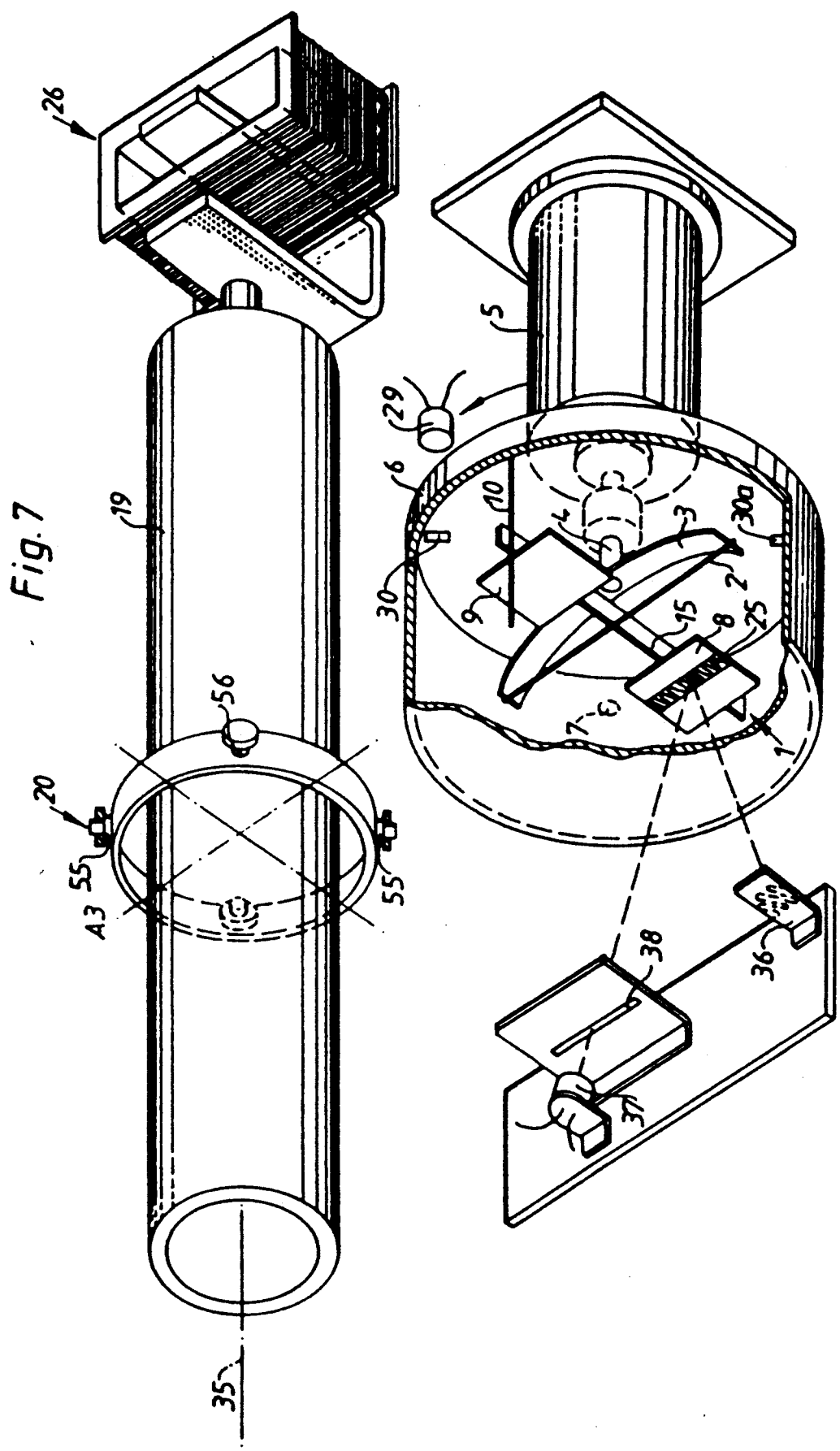
FIG. 7 illustrates an alternative method of rotor detection.
Figure 8:
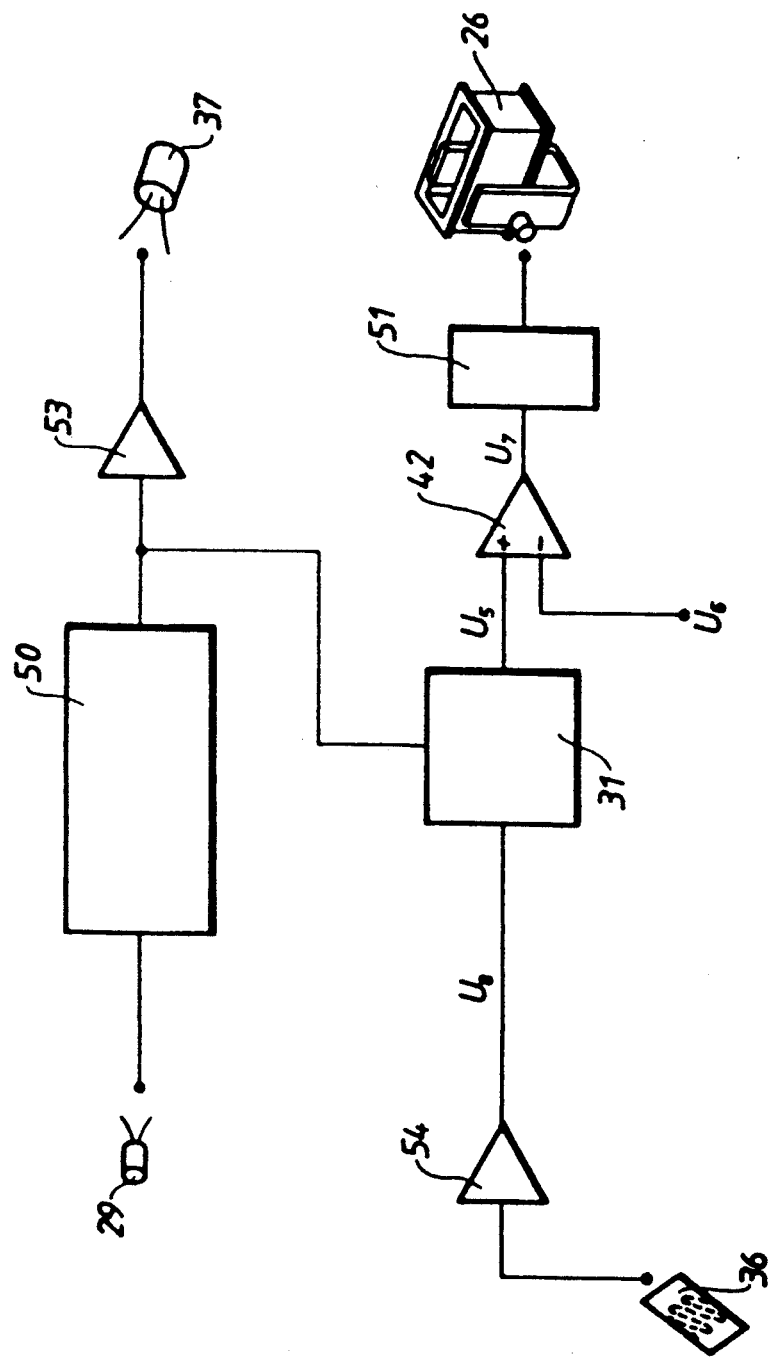
FIG. 8 shows the associated block diagram.

An alternative method of detection for stabilizing purposes will be described briefly below in connection with FIGS. 7 and 8. In doing so control of the mechanical angular position of the gimbaled part about one axis only (indicated A3) orthogonal to the line-of-sight 35 of the instrument will be discussed. A position detector 36, a light diodes 37 pulsed in accordance with the description above and a slot 38 are here secured to the casing and will thus participate in the movements of the instrument casing. A voltage U5 is then obtained after gating into a "sample and hold" circuit in analogy with the description above. It is appreciated that U5 is proportional to the angular deviation $\alpha$ of the plane of rotation.

A second optionally operating detector (not shown) is adapted to give rise to a voltage U6 which is proportional to the angular position of the gimbaled optical part about axis A3 in relation to the instrument casing.

Now, if U5 and U6 are compared in a subtracting circuit 42, an output will be obtained from this circuit in the form of a third voltage U7 which, after frequency filtering in accordance with conventional regulation theory, is applied to an actuator which can turn the gimbaled optical part about the axis (A3) under consideration.

It is to be made clear that the procedures above described of opto-electronic detection of the angular position of the rotor only represent a preferred embodiment. Another type of opto-electronic detection can very well be used, and alternative detection procedures utilizing capacitive or other principles are also conceivable.

If desired motor 5 can be mounted relative to the instrument casing by way of a soft coupling, e.g. a rubber damped coupling. This can be to advantage when it is desired to isolate the instrument casing against possible vibrations which can be transmitted from motor 5 if the rotating parts are not sufficiently balanced dynamically. This will in no way alter the function; what is essential is that motor 5 participates in the slow turning movements of the instrument casing, which makes target tracking possible.

As a matter of course two separately mounted bodies can be stabilized by the same oscillogyro carrying out detecting. Each of these bodies is then mounted about each its axis, the axes being mutually perpendicular. An optical arrangement requesting this kind of mechanics for image stabilizing is examplified by U.S. Pat. No. 3,437,397.

The gimbaled optical part 19 can very well be provided with a further bearing axis parallel to line-of-sight 35 to offer the possibility of turning part 19 small angles about said line 35 in relation to the instrument casing. The control system described above will function also in this case if only it being seen to it that the gating in of the voltage from zero detector 24 via the sample and hold circuit always takes place at the proper time, in accordance with the rule given in the foregoing.

Remaining minor modifications of the mechanics disclosed should also be considered falling within the scope of the invention. An example of such a modification could be replacing leaf spring 3 by some other mechanism for tensioning wire 2, and another modification could be designing light diode 22 such that it gives directly a limited light spread, thus producing directly light band 25 on the rotor mirrors and eliminating slot 23.

I claim:

1. Inertial stabilizing system for an instrument including a casing and a pivotally carried body in relation to the casing of the instrument, comprising
    an oscillogyro as a stability reference which is associated with the casing in such a way that the longitudinal axis of a shaft of the oscillogyro follows substantially the movements of the casing;
    detecting means for detecting the angular position of the rotational plane (RP) of the oscillogyro;
    a control system for affecting the angular position of the pivotally carried body in accordance with the rotational plane (RP) detected, a rotor of the oscillogyro being located within a case;
    a viscous coupling between the rotor and the shaft;
    said coupling enabling intentional angular change of the rotor-reference plane (RP) by intentional angular moving of the casing and thus, via said control system, an angular change of the pivotally carried body.

2. A system according to claim 1,
    wherein air or gas within said case provides the major part of said viscous coupling between the rotor and shaft of the oscillogyro.

3. A system according to claim 1,
    wherein a substantial increase of the stability of the rotational plane (RP) in relation to inertial space is obtained over an angular interval of the angular deviation ($\alpha$), by the feature that an angular resilience is adapted to make possible mutual angular movements, sufficiently large for the purpose, between the rotor and shaft of the oscillogyro in the plane (RP) wherein the rotor rotates.

4. A system according to claim 1,
    wherein said control system is adapted to maintain a constant mutual angular orientation between the rotational plane (RP) of the rotor and the pivotally carried body, at least about one axis.

5. A system according to claim 3,
    wherein the single axis bearing of the oscillogyro comprises a tensioned torsion wire which is secured on either side of the rotor, the distance between securing points being sufficiently small to bring about said angular resilience between the rotor and driver of the oscillogyro.

6. A system according to claim 5,
    further comprising stops for limiting the moving of the rotor in the radial direction of the torsion wire.

7. A system according to claim 6,
    wherein an element is adapted, when the shaft is at rest, to engage resiliently the rotor and thereby lock the rotor in a centered position and that, after start of the oscillogyro, said element frees the rotor at a predetermined rpm by action of centrifugal force.

8. A system according to claim 1,
    wherein the detection means includes at least one light diode and a zero detector, the light diode emitting short light pulses which are reflected by at least one reflecting surface on the rotor to then strike the detector.

9. A system according to claim 8,
    wherein the output signal of the detector is connected to a sample and hold circuit whose output signal is frequency filtered and supplied to an actuator which is adapted to affect the angular position of the pivotally carried body.

10. A system according to claim 1,
    wherein said oscillogyro forming a stability reference includes a shaft which rotates about a longitudinal axis, said shaft driving a rotor by way of a single axis bearing to rotate about said longitudinal axis at a substantially constant rpm, that the longitudinal axis of the shaft participates in the low frequency angular movements of the casing in relation to inertial space;
    wherein an angular deviation ($\alpha$) between the plane (RP) wherein the rotor rotates and a plane (P) orthogonal to said longitudinal axis can arise;
    wherein the rotor is situated within a case where air or gas within the case substantially participates in the rotation of the shaft;
    wherein there is coupling between the rotor and the shaft introducing between the rotor and the shaft a moment substantially proportional to the relative angular speed of the rotor and the shaft about the single axis bearing; a centering of the rotational plane (RP) occurring on a long time basis because of the angular displacement in inertial space which the rotational plane (RP), due to the effect of said coupling, is subjected to at angular deviation (α);

wherein a substantial increase of the stability of the rotational plane in relation to inertial space is obtained over an angular interval of the angular deviation (α) by the feature that an angular resilience is adapted to make possible mutual angular movements, sufficiently large for the purpose, between the rotor and shaft of the oscillogyro in the plane (RP) wherein the rotor rotates.

11. Inertial stabilizing system for an instrument including a casing and a pivotally carried body in relation to the casing of the instrument, comprising:

an oscillogyro as a stability reference which is associated with the casing in such a way that the longitudinal axis of the driver of the oscillogyro follows essentially the movements of the casing;

detecting means for detecting the angular position of the rotational plane (RP) of the oscillogyro;

a control system for affecting the angular position of the pivotally carried body in accordance with the rotational plane (RP) detected;

a rotor of the oscillogyro located within said casing, a coupling between the rotor and the driver introducing a moment between the rotor and the driver about a single axis bearing of the oscillogyro, said moment being substantially proportional to the relative angular speed of the rotor and the driver about said single axis bearing of the oscillogyro, said coupling enabling intentional angular change of the rotor-reference plane (RP) and thus, via said control system, an angular change of the pivotally carried body; and an element is adapted, when the driver is at rest, to engage resiliently the rotor and thereby lock the rotor in a centered position and that, after start of the oscillogyro, said element frees the rotor at a predetermined rpm by action of centrifugal force.

12. Inertial stabilizing system for an instrument including a casing and a pivotally carried body mounted in relation to the casing of the instrument, comprising:

an oscillogyro as a stability reference which is associated with the casing in such a way that the longitudinal axis of the driver of the oscillogyro follows essentially the movements of the casing;

detecting means for detecting the angular position of the rotational plane (RP) of the oscillogyro;

a control system for affecting the angular position of the pivotally carried body in accordance with the rotational plane (RP) detected;

said oscillogyro having a rotor located within said casing; the detection means including at least one light diode and a zero detector, the light diode emitting short light pulses which are reflected by at least one reflecting surface on the rotor to then strike the detector;

the output signal of the detector is connected to a sample and hold circuit whose output signal is frequency filtered and supplied to an actuator which is adapted to affect the angular position of the pivotally carried body.

* * * * *